UNITED STATES PATENT OFFICE.

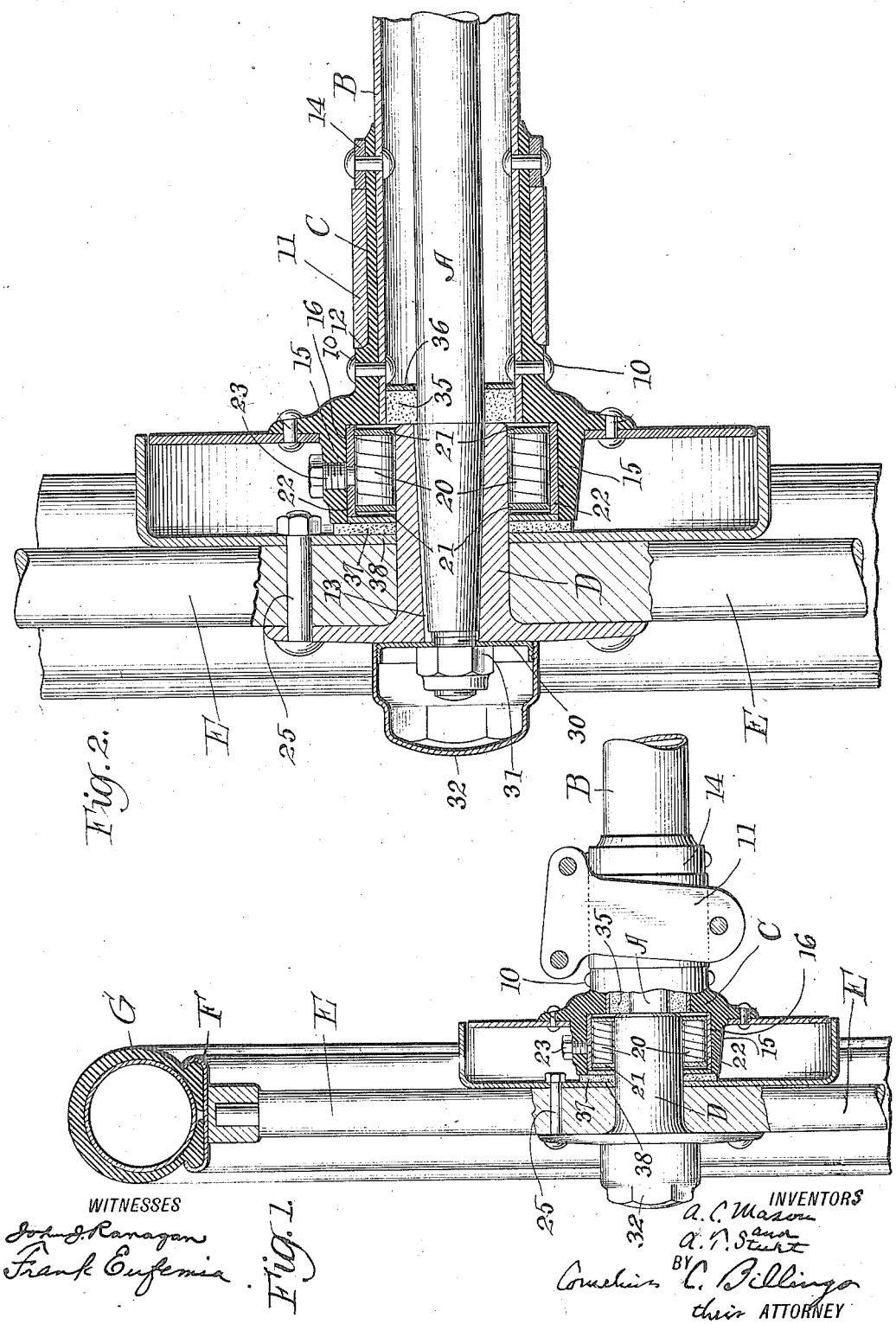

ARTHUR C. MASON AND ALFRED T. STURT, OF FLINT, MICHIGAN, ASSIGNORS TO CHEVROLET MOTOR COMPANY OF NEW YORK, INC., OF NEW YORK, N. Y., A CORPORATION OF NEW YORK.

ANTIFRICTION WHEEL-BEARING.

1,163,026.   Specification of Letters Patent.   Patented Dec. 7, 1915.

Application filed January 11, 1915. Serial No. 1,487.

*To all whom it may concern:*

Be it known that we, ARTHUR C. MASON and ALFRED T. STURT, citizens of the United States of America, and residents of the city of Flint, county of Genesee, State of Michigan, have jointly invented certain new and useful Improvements in Antifriction Wheel-Bearings; and we do hereby declare the following to be a full, clear, and exact description thereof.

The invention relates to improved antifriction bearings for wheels adapted for use in automobile construction.

One of the objects of our invention is to construct an efficient, strong and yet inexpensive anti-friction bearing for wheels which may be assembled to any shaft without modifying or altering the construction of the shaft.

Another object is to provide an anti-friction bearing between the hub of the wheel and some fixed part of the mechanism other than the shaft.

Another object is to provide a construction which can be readily assembled and dismounted.

Other objects will appear from the following description and claims.

The invention consists in the arrangement, construction and combination of parts as will be hereinafter described and pointed out in the claims.

Referring to the drawings; Figure 1, is a plan view partly in horizontal section through the center of the wheel and coöperating parts, the hub of the wheel being shown in plan. Fig. 2, is a longitudinal section through the center of the hub and coacting brake-flange and axle housing, showing the anti-friction device applied thereto, the shaft being illustrated in elevation.

In the drawings like reference characters indicate like parts.

In the particular embodiment of our invention, as disclosed it is applied to the rear axle construction, but the broad invention which consists in the anti-friction bearing placed between the surface of the hub of the wheel and any fixed part other than the shaft, may be also applied to the front wheels.

A is the axle shaft, B the shaft housing, C the brake-flange, D the wheel hub, E the spokes, F the rim and G the tire. A flange concentric to the shaft and hub is secured to the housing by rivets 10 and the spokes of the wheel are secured to the hub by bolts 25 in the usual way. Surrounding the flange is a spring seat 11 which is prevented from longitudinal movement by a seat 12 in the flange and the collar 14. The outer end of the shaft is conical in shape as shown, and the hub of the wheel is constructed to nicely fit over the conical end thereof, and is secured thereto by the key 13. The hub extends a substantial distance inwardly and is preferably case-hardened at its inner end to form a suitable bearing surface for the anti-friction bearings. A flange 15 projects outwardly from the housing and is concentric with the axle and with the hub and it forms an annular recess 16 between it and the hub when the wheel is in place within which recess is fitted an ordinary anti-friction bearing as shown consisting of the rollers 20 inclosed by circular disks 21 and by a ring or bushing of steel 22, said disks and bushings forming a casing for the rollers 20. This concentric steel ring or bushing is held in place by a set screw 23 which is screwed into a hole in the concentric projecting flange 15 of the brake-flange. The hub is smooth on its outer surface and a flanged plate 30 is held thereto by a nut 31 which is screwed to the end of the axle. Screw-threads are provided on the outer edge of the flange and screwed thereto is the usual protecting cap or casing 32. A felt washer 35 is fitted around the shaft between a metal washer 36 and the inner end of the hub. A felt washer 37 is fitted around the hub and held between the portion 38 of the brake casing and the outer end of the flange 15 which projects from the fixed housing.

In assembling the wheel, the felt washer 35 and the metal washer 36 are first placed in position on the shaft. The felt washer 37 is fitted over the end of the hub and the anti-friction bearing is then fitted over th end of the hub and the wheel is then place upon the outer end of the shaft and properly keyed thereto. The set screw 23 is then put in place so as to engage with the steel bushing of the anti-friction bearing so as to hold the bushing in a fixed position. The flanged plate 30 is placed over the projecting end of the shaft and the nut 31 is screwed upon the shaft to hold the wheel and plate 30 in place. The cap or casing 32 is then screwed in place.

In operation, the shaft is caused to turn by suitable connection to the engine of the automobile and the torque will be transmitted to the hub of the wheel. As the nest of anti-friction rollers is situated between the outer surface of the hub and the fixed flange secured to the shaft housing, it is seen that an ample and efficient anti-friction roller bearing will operate against the inner steel bushing on the brake-flange and the outer case-hardened surface of the hub.

While we have shown certain features of our invention in the accompanying drawings, it is to be understood that said drawings are merely illustrative, and that we are not confined to what is there shown and herein described, in connection therewith, except as may be specifically set forth in the claims.

Having now described our invention, what we claim as new and desire to secure by Letters Patent, is:

1. In a device of the class described, a shaft, a wheel mounted thereon having an extended hub, a fixed flange surrounding the hub, an anti-friction device provided with a casing between the hub and the flange, means for holding the casing of the anti-friction device in place.

2. In a device of the class described, a shaft, a wheel mounted thereon having an extended hub, a shaft housing, a flange secured to said housing and surrounding said hub, an anti-friction device between the flange and hub, a casing for holding said anti-friction device in place, means to hold the casing in place and an anti-friction washer between the end of the flange and the side of the wheel.

In witness whereof we have hereunto set our hands at the borough of Manhattan, city and State of New York, this 8th day of January, 1915.

ARTHUR C. MASON.
ALFRED T. STURT.

In presence of—
W. W. MURPHY,
JOHN J. RANAGAN.